United States Patent [19]
Williams

[11] 4,182,274
[45] Jan. 8, 1980

[54] PREVENTION OF LOW TEMPERATURE CORROSION

[75] Inventor: Keith R. Williams, North Canton, Ohio

[73] Assignee: The Babcock & Wilcox Company, New York, N.Y.

[21] Appl. No.: 898,280

[22] Filed: Apr. 20, 1978

[51] Int. Cl.² .............................................. F22B 1/00
[52] U.S. Cl. ............................. 122/4 R; 122/406 ST; 110/204
[58] Field of Search ................ 122/DIG. 1, 1 A, 4 R, 122/406 ST, 479 A, 204, 205, 206, 207

[56] References Cited

U.S. PATENT DOCUMENTS

| | | | |
|---|---|---|---|
| 2,159,849 | 5/1939 | Graemiger | 110/106 |
| 2,744,733 | 5/1956 | Howes | 122/1 |
| 2,762,201 | 9/1956 | Sampson | 122/1 |
| 3,602,164 | 8/1971 | Reintjes | 110/106 |
| 4,090,455 | 5/1978 | McCartney | 110/106 |

FOREIGN PATENT DOCUMENTS 694552  9/1964  Canada ............................... 122/DIG. 1

Primary Examiner—Kenneth W. Sprague
Attorney, Agent, or Firm—J. M. Maguire; R. J. Edwards

[57] ABSTRACT

An arrangement for inhibiting low temperature gas-side corrosion of an out of service steam generator and its heat exchange and gas clean-up adjuncts. The arrangement provides for circulating pressurized heated air through the steam generator and its adjuncts, controlling the pressurization of the air to maintain positive gas-side pressure, controlling the heating of the air to maintain gas-side surfaces above the dew point, and returning the air which has passed through the steam generator and its adjuncts to the forced draft fan to be repressurized, reheated and reintroduced into the steam generator.

5 Claims, 1 Drawing Figure

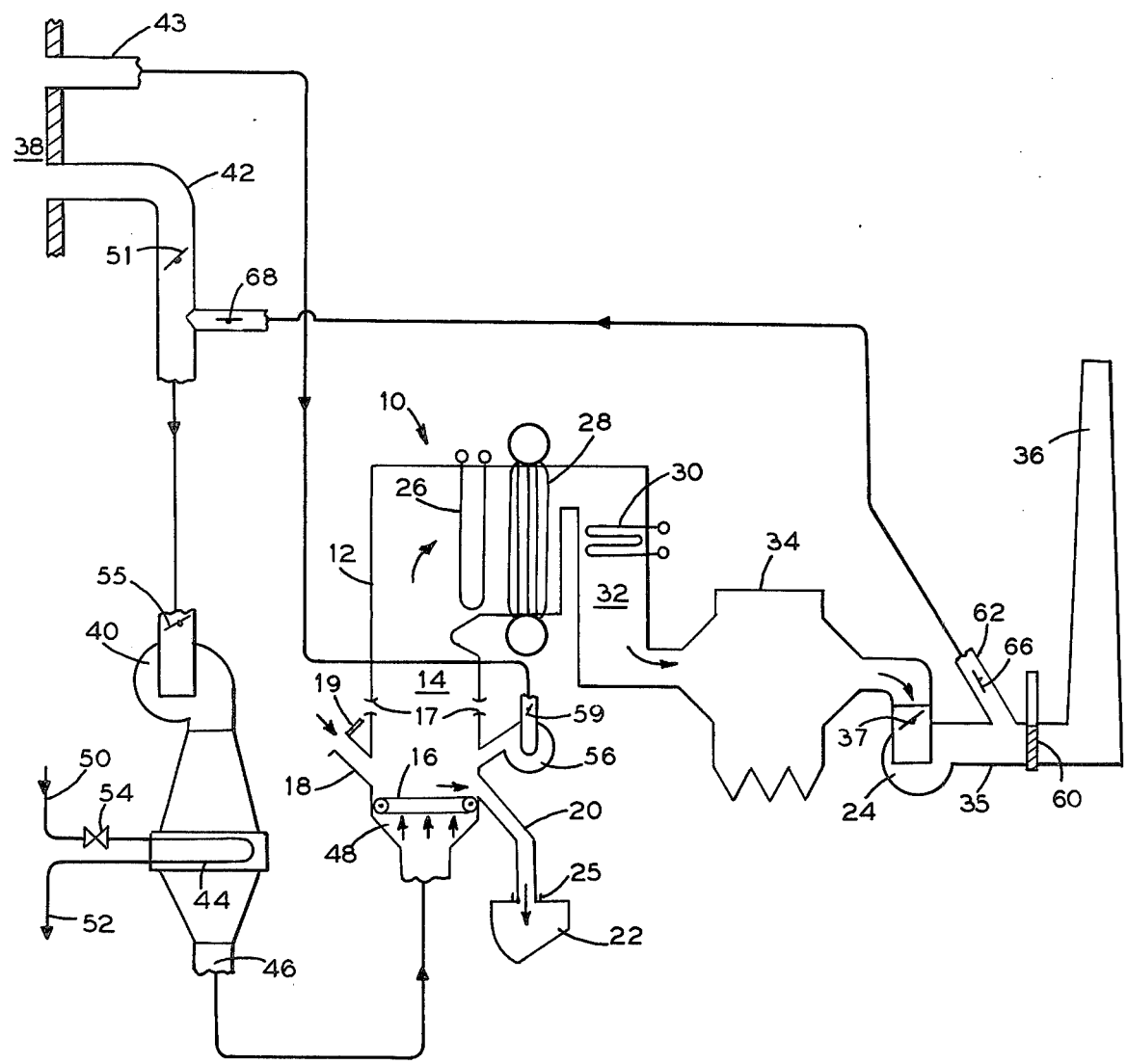

PREVENTION OF LOW TEMPERATURE CORROSION

BACKGROUND OF THE INVENTION

The present invention relates to steam generators and their heat exchange and gas clean-up adjuncts, e.g. tubular or regenerative air heaters and electrostatic or mechanical precipitators, respectively, and more particularly to the protection of gas-side surfaces during shutdown of the steam generator.

Most flue gases contain sulfur and the expose metal parts of the steam generator and its heat exchange and gas clean-up adjuncts must be kept above the dew point, i.e., the temperature at which water vapor begins to condense. The condensation of air entrained vapor is generally recognized as a major contributing factor to out of service corrosion. During shutdown of a steam generator, it is known that ambient air will enter the gas-side and result in cold spots where the water vapor in the air could condense. The condensation of the vapor is promoted when the gas-side is exposed for extended periods to relatively cold air thereby maintaining the heat transfer surfaces in a moist condition. The condensate combines with sulfur bearing deposits to form acids which corrode the exposed gas-side metal surfaces. It is an object of the present invention to provide an arrangement whereby the gas-side surfaces are kept above the dew point at all times while the steam generator and its heat exchange and gas clean-up adjuncts are out of service.

SUMMARY OF THE INVENTION

In accordance with the invention, when the steam generator and its heat exchange and gas clean-up adjuncts are out of service, a controlled quantity of pressurized heated air is introduced into the steam generator. The air is pressurized by a forced draft fan and heated by a steam coil air heater supplied from an auxiliary steam source. The pressurization of the air is controlled to maintain a positive gas-side pressure throughout the steam generator and its adjuncts thereby assuring that ambient air cannot enter and result in local cold spots where water vapor in the air could condense. The heating of the air is controlled to maintain the gas-side surfaces of the steam generator and its adjuncts above the dew point. A guillotine type shut-off damper is provided in the duct leading to the stack, the damper is in its closed position while pressurized heated air is circulated through the steam generator and its adjuncts. After the air has passed through the steam generator and its adjuncts it is conveyed through a return duct to the intake duct of the forced draft fan to be repressurized, reheated and reintroduced into the steam generator. Make-up air must be added to the intake duct to replace leakage losses through the setting of the steam generator and its adjuncts. The make-up air combines with the returned air and is pressurized, heated and introduced into the steam generator. This circulating arrangement permits maximum flexibility in adjusting the flow rate, pressure, and temperature of the air stream to suit actual conditions encountered.

BRIEF DESCRIPTION OF THE DRAWING

The drawing is a schematic diagram of a refuse-fired steam generator and an electrostatic precipitator embodying the invention.

DETAILED DESCRIPTION OF THE PREFERRED EMBODIMENT

The present invention is illustrated with respect to a refuse-fired steam generator. However, it should be recognized that the invention is equally well adapted for use with fossil fuel-fired steam generators.

Referring to the drawing, there is shown a refuse-fired steam generator 10 including refractory-lined water cooled tube walls 12 which define a furnace chamber 14. A stoker 16 is located along the bottom of furnace chamber 14. The stoker 16 is of the traveling grate type in which a grate surface receives fuel from chute 18, in this instance refuse. A gate 19 shuts off the flow of refuse when the steam generator 10 is out of service. The refuse burns progressively as the grate advances to the right and the ash is discharged over the rear end, down chute 20 and into an ash quenching tank 22. A water seal 25 surrounds the discharge end of chute 20. Fuel oil or gas fired supplemental burners 17 are used to maintain the required combustion zone temperature whenever high moisture refuse is delivered to the stoker 16.

An induced draft fan 24 provides the suction which causes the hot flue gases, generated by the combustion of refuse, to flow upwardly through the furnace chamber 14 and then serially over the tubes of a superheater 26, a generating tube bank 28 and an economizer 30. It should be recognized that the flue gases passing over the furnace, superheater, generating bank and economizer tubes give up their heat to the fluid flowing through the tubes. The flue gases leaving the convection pass 32 flow through an electrostatic precipitator 34 for the removal of entrained fly ash. The cleaned flue gases leaving the induced draft fan 24 are conveyed through duct 35 to a stack 36 for discharge to atmosphere. The induced draft fan 24 is equipped with an inlet control damper 37 which is regulated to maintain a predetermined negative pressure within the furnace chamber 14 during operation of the steam generator 10.

Combustion air for the stoker 16 is obtained from the refuse pit 38 which vents into a forced draft air duct 42 and an overfire air duct 43. A forced draft fan 40 causes the undergrate air to flow from the refuse pit 38 through the duct 42 and over the tubes of a steam coil air heater 44. A conduit 50 delivers pressurized steam to the tubes of the steam coil air heater 44, the steam condenses while giving up heat to the air flowing around the tubes, and the condensate is removed through the conduit 52. A control valve 54 regulates the quantity of steam being admitted to the air heater 44 thereby controlling the temperature of the air leaving the heater 44. The heated undergrate air leaving the steam coil air heater 44 flows through a duct 46 to an air plenum 48 situated beneath the stoker 16. The heated air passes through the stoker grate and contributes to the combustion of the refuse. The duct 42 includes control dampers 51 and 55, the latter is regulated to control the quantity of undergrate air being delivered to the stoker 16 in accordance with the requirements for combustion of the refuse. An overfire air fan 56 causes the overfire air to flow from the refuse pit 38 through the duct 43 and to be introduced into the furnace chamber 14 at a location above the stoker 16. The overfire air mixes with the furnace gases and creates the turbulence required to complete combustion of the refuse. The duct 43 includes a control damper 59, the latter is regulated to control the quantity of overfire air being delivered to the furnace chamber 14 pursuant to the requirements for combustion of the refuse.

In accordance with the invention, a guillotine type shut-off damper 60 is operatively associated with the duct 35, and a return duct 62 interconnects the ducts 35 and 42. The return duct 62 includes shut-off dampers 66 and 68 located at its inlet and outlet ends, respectively.

When the steam generator is out of service, the refuse chute gate 19, the overfire air control damper 59, the supplemental fuel burner 17 air registers, not shown, and the shut-off damper 60 are set in their closed position. The induced draft fan control damper 37 and the return duct shut-off dampers 66 and 68 are set in their open position. The forced draft fan 40 is operating to deliver undergrate air from the refuse pit 38 to the steam generator 10. The forced draft fan control damper 55 is regulated to maintain a slight positive pressure throughout the steam generator 10 and the electrostatic precipitator 34. By maintaining the steam generator 10 and the electrostatic precipitator 34 under slight positive pressure, any leakage will be outward thereby assuring that ambient air cannot enter the gas-side and result in local cold spots where water vapor in the air could condense and combine with sulfur bearing deposits to form corrosive acids which could have a deleterious effect on the metal surfaces. The undergrate air being conveyed to the steam generator 10 is heated as it passes through the steam coil air heater 44. The positive flow of heated air contacts all surfaces of the steam generator 10 and the precipitator 34 which are normally exposed to flue gas and gives up its heat to these surfaces to maintain them well above dew point. It should be recognized that steam for the heater 44 is provided by an auxiliary source and is regulated to heat the air passing therethrough to the temperature required to assure that the air temperature leaving the precipitator 34 remains above dew point. The air leaving the precipitator 34 passes through the induced draft fan 24, which is not operating, and is then returned to the duct 42 by way of ducts 35 and 62. Make-up air to replace leakage from the steam generator 10, the precipitator 34, and associated ducts is obtained from the refuse pit 38 and is regulated by the control damper 51. The make-up air combines with the air being returned through duct 62 and the combined air passes through the portion of duct 42 leading to the forced draft fan 40 to resume the flow cycle through the steam coil air heater 44, the steam generator 10 and the electrostatic precipitator 34. The positive circulation of heated air is continuously maintained while the steam generator 10 is out of service.

When the steam generator 10 is in service, the shut-off dampers 66 and 68 in the return duct 62 are set in their closed position. The control damper 51, the refuse chute gate 19, and the shut-off damper 60 are set in their open position. The supplemental burner 17 air registers, not shown, are open whenever the burners 17 are in service. The overfire air control damper 59 is regulated to deliver the required quantity of overfire air to the furnace chamber 14. The forced draft fan control damper 55 is regulated to deliver the required quantity of undergrate air, and the induced draft fan damper 37 is regulated to maintain the required negative pressure in the furnace chamber 14. The steam coil air heater 44 is in service to heat the undergrate air in accordance with combustion requirements.

While in accordance with the provisions of the statutes there is illustrated and described herein a specific embodiment of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. In combination with a steam generator, a source of air, a forced draft fan disposed in flow receiving relation with the source of air, an air heater interposed between the fan and the steam generator, a stack disposed in flow receiving relation with the steam generator, a shut-off damper interposed between the steam generator and the stack, and conduit means for returning the air from a location intermediate the steam generator and the shut-off damper to a location intermediate the source of air and said forced draft fan.

2. The combination according to claim 1 including a precipitator interposed between the steam generator and said fist named location.

3. A method for inhibiting low temperature corrosion of gas-side surfaces of an out of service steam generator including introducing pressurized heated air into the steam generator, controlling the pressurization of the air to maintain positive pressure on the gas-side of the steam generator, controlling the heating of the air to maintain the gas-side surfaces above dew point, and returning the air discharged from the steam generator for repressurization, reheating and reintroduction into said steam generator.

4. The method according to claim 3 wherein an out of service electrostatic precipitator is disposed at the discharge end of the steam generator, and including passing the pressurized heated air discharging from the steam generator through the precipitator before returning the air for reintroduction into the steam generator, maintaining positive pressure on the gas-side of the precipitator, and maintaining the gas-side surfaces of said precipitator above dew point.

5. The method according to claim 4 including pressurizing and heating additional air to make up for air losses through the setting of said generator and precipitator.

* * * * *